United States Patent [19]

Mineshima et al.

[11] 4,316,966
[45] Feb. 23, 1982

[54] PROCESS FOR PRODUCING CHEMICALLY BLENDED PROPYLENE RESIN COMPOSITION

[75] Inventors: Hideo Mineshima, Ohtake; Nobuo Sato; Susumu Masaki, both of Ichihara, all of Japan

[73] Assignee: Mitsui Petrochemical Industries Ltd., Tokyo, Japan

[21] Appl. No.: 197,530

[22] Filed: Oct. 16, 1980

[30] Foreign Application Priority Data

Oct. 16, 1979 [JP] Japan ................. 54-132436

[51] Int. Cl.$^3$ ................................................. C08F 297/08
[52] U.S. Cl. ..................................... 525/53; 525/240
[58] Field of Search ....................................... 525/53

[56] References Cited

U.S. PATENT DOCUMENTS

| | | | |
|---|---|---|---|
| 4,048,412 | 9/1977 | Caumartin et al. | 525/53 |
| 4,066,718 | 1/1978 | Saito et al. | 525/53 |
| 4,076,924 | 2/1978 | Toyota et al. | 526/125 |
| 4,085,276 | 4/1978 | Toyota et al. | 526/122 |
| 4,128,606 | 12/1978 | Furetachi et al. | 525/247 |
| 4,143,223 | 3/1979 | Toyota et al. | 526/125 |
| 4,157,435 | 6/1979 | Toyota et al. | 526/125 |
| 4,226,741 | 10/1980 | Luciani et al. | 252/429 B |
| 4,232,139 | 11/1980 | Minami et al. | 526/125 |

FOREIGN PATENT DOCUMENTS

| | | |
|---|---|---|
| 1492618 | 11/1977 | United Kingdom . |
| 1542224 | 3/1979 | United Kingdom . |
| 1554340 | 10/1979 | United Kingdom . |
| 2035343 | 6/1980 | United Kingdom . |

OTHER PUBLICATIONS

Derwent Abstract 17651A/10 (3/2/78).
Derwent Abstract 02827Y/02 (11/26/76).
Derwent Abstract 71468Y/40 (8/23/77).
Derwent Abstract 95431X/51 (11/5/76).
Derwent Abstract 55831R-A (7/30/70).
Derwent Abstract 60,797P (11/22/62).

Primary Examiner—Stanford M. Levin
Attorney, Agent, or Firm—Sherman & Shalloway

[57] ABSTRACT

In a process for producing a chemically blended propylene resin composition having an ethylene content of about 1 to about 40 mole % based on the entire monomer units of the resin composition which comprises (i) a pre-polymerization step, and (ii) a multiplicity of subsequent polymerization steps, the improvement wherein (I) the pre-polymerization step (i) is either (I-A) a step wherein about 1 to about 1500 g, per millimole of titanium atom, of ethylene is polymerized, (I-B) a step wherein about 1 to about 1500 g, per millimole of titanium atom, of propylene is polymerized, or (I-C) a step wherein about 1 to about 1000 g, per millimole of titanium atom, of an alpha-olefin having 4 to 10 carbon atoms is polymerized, and (II) said multiplicity of polymerization steps (ii) are the following steps (II-1), (II-2) and (II-3) which are carried out in separate reaction zones different from the reaction zone of the pre-polymerization step (i) in this order or in the order of (II-1), (II-3) and (II-2), (II-1) a step of polymerizing propylene to form not less than about 5000 g, per millimole of titanium atom, of crystalline polypropylene having an isotactic index of at least 90 which accounts for about 55 to about 95% by weight of the final resin composition, provided that when step (I-B) is employed as the pre-polymerization step (i), the amount of the product includes that of polypropylene formed in step (I-B), (II-2) a step of polymerizing propylene and ethylene to form an amorphous or a low-crystalline propylene/ethylene copolymer containing about 20 to about 80 mole % of propylene units, and (II-3) a step of polymerizing ethylene, or both ethylene and propylene, to form crystalline polyethylene or a crystalline ethylene/propylene copolymer containing up to about 20 mole % of propylene units.

7 Claims, No Drawings

PROCESS FOR PRODUCING CHEMICALLY BLENDED PROPYLENE RESIN COMPOSITION

This invention relates to an improved process for producing in high yields and with a good reproducibility of quality a chemically blended propylene resin composition which has excellent impact strength especially at low temperatures, rigidity and gloss in a well-balanced combination and is suitable for molding.

The term "chemically blended polymer composition", as used in the present application, means that the composition is not a so-called polymer blend which is obtained by first preparing different polymers or copolymers and then blending them physically.

Although crystalline polypropylene produced by using stereoregular catalysts has superior rigidity and thermal stability, it has low impact strength particularly at low temperatures, and this disadvantage limits its uses.

In an attempt to overcome this disadvantage, it was previously proposed to produce polymer compositions by mixing polypropylene with polyethylene or an ethylene/propylene copolymer (for example, U.S. Pat. No. 3,256,367, and Japanese Patent Publications Nos. 7345/66 and 22626/70). With a physical blending means, however, it is difficult to attain such a high degree of uniformity in the mixing and dispersion of ingredients in the resulting polymer composition as can be done by a chemical means of multi-step polymerization in accordance with the present invention. Presumably for this reason, these prior methods cannot avoid an incident deterioration in the desirable properties of polypropylene itself although they do bring about some improvement in the impact resistance of the resulting polymer composition. The mixing operation, too, is complex, and it is necessary first to prepare polymers to be blended, and then to melt-mix them by this complex operation using extra equipment.

Some suggestions were made, on the other hand, to provide chemically blended polymer compositions by a multi-step polymerization process in an attempt to overcome these difficulties of the polymer blending methods.

For example, U.S. Pat. No. 4,128,606 proposes a three-step process for producing an impact-resistant chemically blended propylene polymer composition, which comprises forming crystalline polypropylene composed substantially of propylene and having an isotactic index of at least 90 in the presence of a catalyst composed of (1) a carrier-supported titanium catalyst component containing at least magnesium, halogen and titanium, preferably together with an organic carboxylic acid ester, on the surface of the carrier and (2) an organoaluminum compound; forming a low-crystalline propylene-rich propylene/ethylene copolymer in the presence of the resulting product and the catalyst in the same reaction zone or in a separate reaction zone; and then forming polyethylene or an ethylene-rich ethylene/propylene copolymer having an intrinsic viscosity of at least 2.6 in the presence of the reaction product of the second step and the catalyst in the same reaction zone or in a separate reaction zone, thereby to provide a chemically blended polymer composition having an ethylene content of 3 to 40 mole%.

German Patent Publication (DT-OS) 2,739,608 proposes a two-step process for producing an alphaolefin polymer or copolymer having an improved stereoregularity and bulk density with an improved catalytic activity, which comprises polymerizing or copolymerizing an alpha-olefin having at least 3 carbon atoms or copolymerizing alpha-olefins having at least 3 carbon atoms with each other or with ethylene in first and second steps in the presence of a catalyst comprising a solid titanium complex catalyst component consisting essentially of magnesium, titanium, halogen and an electron donor, and an organometallic compound of a metal of Groups I to III of the periodic table, wherein in the first step, at least about 100 millimoles, per millimole of titanium atom, of an alpha-olefin is polymerized or copolymerized at a temperature of less than about 50° C. to form a polymer or copolymer the amount of which is not more than about 30% by weight based on the final product obtained in the second step, and in the second step, the final product is formed at a temperature higher than the temperature of the first step and from about 50° C. to about 90° C.

Furthermore, Japanese Laid-Open Patent Publication No. 71712/80 published on May 30, 1980 (corresponding to DT-OS No. 2,946,980, and British Patent Application No. 2,035,343) which was filed before the priority date of the present application and published after the priority date of the present application proposes a process for producing a modified polypropylene in the presence of a stereoregular polymerization catalyst which comprises, in combination, step 1 wherein propylene is polymerized at a temperature not higher than 60° C. to produce from 0.5% to 30% by weight, preferably from 1% to 10% by weight, of a crystalline propylene polymer on the basis of the total polymerization product obtained in steps 1 to 2; step 2 wherein propylene is further polymerized at a temperature which is at least 5° C. higher than that of step 1 to produce from 60% to 95% by weight of a crystalline propylene polymer on the basis of the total polymerization product in steps 1 to 3, the quantity of the crystalline propylene polymer being the total quantity obtained in steps 1 and 2; and step 3 wherein a member selected from ethylene and an ethylenepropylene mixture is polymerized to produce from 5% to 40% by weight of an ethylene polymer on the basis of the total polymerization product in steps 1 to 3, the ethylene content in the resulting ethylene polymer being from 100% to 20% by weight.

In the second proposal, an attempt is made to obtain an alpha-olefin polymer or copolymer having an improved stereoregularity and bulk density by a two-step process with an improved catalytic activity. DT-OS No. 2,739,608 does not at all refer to the use of a process having a greater number of steps, and is quite silent on what process should be used in order to provide a chemically blended propylene resin composition having excellent impact strength at low temperatures, rigidity and gloss in a well-balanced combination while retaining the desirable properties of polypropylene.

The first and third proposals show a three-step process under different combinations of conditions, and commonly refer to the improvement of impact strength. It has been found however that these processes still have to be improved in order to produce a chemically blended propylene resin composition having superior low-temperature impact strength, rigidity and gloss in a well-balanced combination in high yields with a good reproducibility of quality.

It is known that polypropylene generally has superior rigidity, for example a high flexural stress, but its impact strength, especially at low temperatures, is not satisfactory. The impact strength can be increased by increasing the ethylene content of a propylene resin composition. However, increasing the ethylene content to a level conducive to substantial improvement of the impact strength will cause the trouble of reduced surface gloss and rigidity of molded articles from the resulting resin composition. This is no exception in the case of a chemically blended propylene resin composition, and it has still been desired to develop a technique which can achieve a satisfactory improvement by solving the above problem.

In the aforesaid third proposal, there is disclosed a process which comprises a first step of forming a relatively small amount, preferably 1 to 10% by weight, of crystalline polypropylene, a second step of forming a major amount of crystalline polypropylene and a third step of forming an ethylene polymer or copolymer which may contain up to 80% by weight of propylene. The low temperature impact strength of the resulting product is not satisfactory, and in the third proposal, the impact strength of the resin composition is shown by a Charpy impact strength test at 20° C. No mention is made of the gloss of the product. Furthermore, the Japanese Laid-Open Patent Publication No. 71712/80 states that the first step and the second step may be performed in the same polymerization vessel or in separate polymerization vessels. However, in all of the working examples in this Publication, the three steps are carried out in the same polymerization vessel. Furthermore, titanium trichloride is recommended as an especially preferred species of the transition metal catalyst component, and it is stated that titanium trichloride supported on a magnesium halide or a co-pulverization product of titanium trichloride and an ether or ester can be used. All of the working examples, however, are directed to the use of a catalyst consisting of titanium trichloride and diethyl aluminum monochloride.

Extensive investigations of the present inventors have now led to the discovery that a chemically blended propylene resin composition having superior impact strength, rigidity and gloss in a well-balanced combination and being suitable for molding can be produced with an excellent reproducibility of quality without involving the technical difficulties of the prior proposals mentioned above by a process which comprises pre-polymerizing a small amount of ethylene, propylene or a $C_4$-$C_{10}$ alpha-olefin in the presence of a catalyst containing a specified highly active titanium catalyst component, and then performing a series of steps of forming crystalline polypropylene, a low-crystalline or amorphous ethylene/propylene copolymer, and crystalline polyethylene or a crystalline ethylene/propylene copolymer in the presence of the product obtained in the pre-polymerization step and the catalyst used in the prepolymerization step in separate reaction zones which are different from the reaction zone in which the pre-polymerization is performed.

It is an object of this invention therefore to provide an improved process for producing a chemically blended propylene resin composition having improved properties and being suitable for molding.

The above and other objects and advantages of this invention will become apparent from the following description.

According to this invention, there is provided a process for producing a chemically blended propylene resin composition having an ethylene content of about 1 to about 40 mole%, preferably about 2 to about 35 mole%, based on the entire monomer units of the resin composition, which comprises (i) a pre-polymerization step wherein a small amount of ethylene or an alpha-olefin is polymerized in the presence of a catalyst composed of (a) a titanium catalyst component containing magnesium, titanium, halogen and an electron donor and (b) an organometallic compound catalyst component of a metal of Groups I to III of the periodic table, and (ii) a multiplicity of subsequent polymerization steps wherein propylene and ethylene are polymerized in the presence of the reaction product containing the catalyst of the pre-polymerization step (i); characterized in that (I) the pre-polymerization step is either (I-A), (I-B) or (I-C) below, (I-A) a step wherein about 1 to about 1500 g, per millimole of titanium atom, of ethylene is polymerized, (I-B) a step wherein about 1 to about 1500 g, per millimole of titanium atom, of propylene is polymerized, or (I-C) a step wherein about 1 to about 1000 g, per millimole of titanium atom, of an alphaolefin having 4 to 10 carbon atoms is polymerized, and in that (II) said multiplicity of polymerization steps (ii) are the following steps (II-1), (II-2) and (II-3) which are carried out in separate reaction zones different from the reaction zone of the pre-polymerization step (i) in this order or in the order of (II-1), (II-3) and (II-2), (II-1) a step of polymerizing propylene to form not less than about 5,000 g, per millimole of titanium atom, of crystalline polypropylene having an isotactic index of at least 90 which accounts for about 55 to about 95% by weight of the final resin composition, provided that when step (I-B) is employed as the pre-polymerization step (i), the amount of the product includes that of polypropylene formed in step (I-B), (II-2) a step of polymerizing propylene and ethylene to form an amorphous or a low-crystalline propylene/ethylene copolymer containing about 20 to about 80 mole% of propylene units, and (II-3) a step of polymerizing ethylene, or both ethylene and propylene, to form crystalline polyethylene or a crystalline ethylene/propylene copolymer containing up to about 20 mole% of propylene units.

The catalyst used in the process of this invention is composed of (a) a titanium catalyst component containing magnesium, titanium, halogen and an electron donor and (b) an organometallic compound of a metal of Groups I to III of the periodic table, preferably an organoaluminum compound.

The titanium catalyst component (a) can be obtained by contacting metallic magnesium or a magnesium compound, a titanium compound and an electron donor intimately with each other, at least one of the magnesium and titanium compounds containing halogen, by such means as heating or copulverization. The halogen/titanium mole ratio in the titanium catalyst component (a) is preferably more than about 4, for example from about 4 to about 50. It is preferred that when the component (a) is washed with hexane at room temperature, titanium should not substantially be removed from it.

The chemical structure of the reaction product as the titanium catalyst component (a) is not known, but it is presumed that the magnesium atom and the titanium atom are firmly bonded to each other, for example in such a manner that they have halogen in common. Depending upon the method of preparation, the titanium catalyst component (a) may contain other metal atoms such as aluminum, silicon, tin, boron, germanium, calcium or zinc. Alternatively, it may contain organic or inorganic inert diluents such as LiCl, $CaCO_3$, $BaCl_2$, $Na_2CO_3$, $SrCl_2$, $B_2O_3$, $Na_2SO_4$, $Al_2O_3$, $SiO_2$, $TiO_2$, $NaB_4O_7$, $Ca_3(PO_4)_2$, $CaSO_4$, $Al_2(SO_4)_3$, $CaCl_2$, $ZnCl_2$, polyethylene, polypropylene and polystyrene.

Suitable electron donors are those containing organic acid esters or ethers.

In the titanium catalyst component (a) used in this invention, the mole ratio of halogen/titanium is suitably more than about 4, preferably at least about 5, more preferably at least about 8; the mole ratio of magnesium/titanium is suitably at least about 3, preferably about 5 to about 50; and the mole ratio of the electron donor/titanium is suitably from about 0.2 to about 6, preferably from about 0.4 to about 3, more preferably from about 0.8 to about 2. Furthermore, the titanium catalyst component (a) has a specific surface area of at least about 3 $m^2/g$, preferably at least about 40 $m^2/g$, more preferably at least about 100 $m^2/g$. It is desirable further that the X-ray spectrum of the titanium catalyst component shows an amorphous character irrespective of the type of the starting magnesium compound, or is more amorphous than an ordinary commercial grade magnesium dihalide, for example.

The titanium catalyst component (a) that can be used in this invention and methods for its production are extensively discussed in patent documents, for example Japanese Laid-Open Patent Publications Nos. 20297/76, 127185/76, 136625/76, and 100596/77, British Pat. Nos. 1,502,886, 1,505,315, 1,542,224, 1,504,323, and 1,554,340, U.S. Pat. Nos. 4,107,414, and 4,069,169, and German Laid-Open Patent Publications Nos. 2504036, 2724971, and 2643143.

Typical methods disclosed in these patent documents involve reacting at least a magnesium compound (or metallic magnesium), an electron donor and a titanium compound.

Examples of the electron donor include oxygencontaining electron donors such as water, alcohols, phenols, ketones, aldehydes, carboxylic acids, esters, ethers and acid amides; and nitrogen-containing electron donors such as ammonia, amines, nitriles and isocyanates. Specific examples of these electron donors are alcohols having 1 to 18 carbon atoms such as methanol, ethanol, propanol pentanol, hexanol, octanol, dodecanol, octadecyl alcohol, benzyl alcohol, phenylethyl alcohol, cumyl alcohol and isopropylbenzyl alcohol; phenols having 6 to 15 carbon atoms which may have a lower alkyl group, such as phenol, cresol, xylenol, ethylphenol, propylphenol, cumylphenol and naphthol; ketones having 3 to 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthoaldehyde; organic acid esters, preferably organic carboxylic acid esters, having 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, gamma-butyrolactone, deltavalerolactone, coumarine, phthalide and ethylene carbonate; acid halides having 2 to 15 carbon atoms such as acetyl chloride, benzyl chloride, toluic acid chloride and anisic acid chloride; ethers having 2 to 20 carbon atoms such as methyl ether, ethyl ether, isopropyl ether, butyl ether, amyl ether, tetrahydrofuran, anisole and diphenyl ether; acid amides such as acetamide, benzamide and toluamide; amines such as methylamine, ethylamine, diethylamine, tributylamine, aniline, tribenzylamine, pyridine, picoline and tetramethyl ethylenediamine; nitriles such as acetonitrile, benzonitrile and tolunitrile; and aluminum, silicon and tin compounds having the functional groups of the aforesaid compounds in the molecule. These electron donors may be used as a mixture of two or more.

Preferred magnesium compounds used in the preparation of the titanium catalyst component (a) are those which contain halogen and/or an organic group. Specific examples of the magnesium compounds include dihalides, alkoxyhalides, aryloxyhalides, hydroxyhalides, dialkoxides, diaryloxides, alkoxyaryloxides, acyloxyhalides, alkylhalides, arylhalides, dialkyl compounds, diaryl compounds and alkylalkoxides of magnesium. Examples of organic groups which these magnesium compounds may include alkyl groups having 1 to 12 carbon atoms, alkoxy groups having 1 to 12 carbon atoms, aryl or aryloxy groups having 6 to 15 carbon atoms, and acyl groups having 7 to 15 carbon atoms. Examples of the halogen atom which these magnesium compounds may have include Cl, Br and I.

The magnesium compound may be in the form of an adduct with the aforesaid electron donor. Or it may be in the form of a complex compound containing another metal such as aluminum, tin, silicon, germanium, zinc or boron. Or it may be a complex compound with a halide, alkyl compound, alkoxyhalide, aryloxyhalide, alkoxide or aryloxide of such other metal. Or it may also be a complex compound in which magnesium metal is bonded to phosphorus, boron, etc. through oxygen. These magnesium compounds may, of course, be used as a mixture of two or more. The above-exemplified compounds can usually be expressed by simple chemical formulae. But depending upon the method of producing the magnesium compounds, the they may not be represented by simple formulae, and in such a case they are regarded as mixtures. For example, compounds obtained by reacting magnesium metal with an alcohol or phenol in the presence of a halosilane, phosphorus oxychloride or thionyl chloride, or by decomposing a Grignard reagent with heat or with a compound having a hydroxyl group, a carbonyl group, an ester linkage or an ether linkage are considered to be mixtures of various compounds. Such mixtures can also be used in the present invention.

Various methods are known to produce these magnesium compounds, and the magnesium compounds used in this invention may be produced by any of these methods. If desired, the magnesium compound may be treated prior to use. For example, there is a method which comprises dissolving the magnesium compound in ether or acetone either alone or together with another metal compound and then evaporating the solvent, or by pouring it into an inert solvent, thereby separating the solid. There can also be used a method in which at least one magnesium compound with or without another metal compound is mechanically pulverized in advance.

Among the above-exemplified magnesium compounds, the dihalides, aryloxyhalides and aryloxides of magnesium and complex compounds of these magnesium compounds with aluminum, silicon, etc. are preferred. More specifically, they include $MgCl_2$, $MgBr_2$, $MgI_2$, $MgF_2$, $MgCl(OC_6H_5)$, $Mg(OC_6H_5)_2$, $MgCl(OC_6H_4\text{-}2\text{-}CH_3)$, $Mg(OC_6H_4\text{-}2\text{-}CH_3)_2$, $(MgCl_2)_x\cdot[Al(OR)_nCl_{3-n}]_y$, and $(MgCl_2)_x\cdot[Si(OR)_mCl_{4-m}]_y$. In the above formulae, R represents a hydrocarbon group such as an alkyl group, for example, a $C_1$ to $C_{12}$ alkyl group or an aryl group, for example a $C_6$ to $C_{15}$ aryl group, mR's or nR's may be identical or different, n is a number represented by $0 \leq n \leq 3$, m is a number represented by $0 \leq m \leq 4$, and x and y are positive numbers. Especially preferred magnesium compounds are magnesium dihalides, especially magnesium chloride, and complexes of these.

Preferred titanium compounds are tetravalent titanium compounds represented by the following formula $$Ti(OR)_gX_{4-g}$$

wherein R represents an alkyl group, for example an alkyl group having 1 to 12 carbon atoms, X represents a halogen atom such as Cl, Br and I, and g is a number represented by $0 \leq g \leq 4$.

Specific examples of the tetravalent titanium compounds include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\text{ }n\text{-}C_4H_9)Cl_3$, $Ti(OC_2H_5)Br_3$ and $Ti(O\text{ }iso\text{-}C_4H_9)Br_3$; alkoxytitanium dihalides such as $Ti(OCH_3)_2Cl_2$, $Ti(OC_2H_5)_2Cl_2$, $Ti(O\text{ }n\text{-}C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O\text{ }n\text{-}C_4H_9)_3Cl$ and $Ti(OC_2H_5)_3Br$; and tetraalkoxytitaniums such as $Ti(OCH_3)_4$, $Ti(OC_2H_5)_4$ and $Ti(O\text{ }n\text{-}C_4H_9)_4$. Of these, the titanium tetrahalides, especially titanium tetrachloride, are preferred.

The titanium catalyst component (a) containing magnesium, titanium, halogen and an electron donor can be prepared by reacting the above-exemplified magnesium compound or metallic magnesium, electron donor and titanium compound in accordance with various embodiments described below.

[L] Method comprising reacting the magnesium compound with the electron donor and then reacting the product with the titanium compound:

(L-a) Method which involves copulverization of the magnesium compound and the electron donor:

The electron donor added at the time of copulverization needs not to be in free state, and may be in the form of an adduct with the magnesium compound. The copulverization may be carried out in the presence of the aforesaid organic or inorganic inert diluent, a halogenating agent such as a halogen compound of silicon, polysiloxane and other silicon compounds, an additional component such as aluminum, germanium or tin, or a part of the titanium compound, which may be incorporated in the final complex compound. The electron donor may be present in the form of an adduct (complex) with these compounds. The amount of the electron donor used in this method is preferably about 0.005 to about 10 moles, more preferably about 0.01 to about 1 mole, per mole of the magnesium compound.

The copulverization may be carried out by using various devices such as a rotary ball mill, a vibratory ball mill or an impact mill. In the case of the rotary ball mill, when 20 to 40 g of the materials are to be treated in a stainless steel (SUS 32) ball mill cylinder having an inner capacity of 800 ml and an inside diameter of 100 mm containing 100 stainless steel (SUS 32) balls having a diameter of 15 mm, the copulverization of these materials is preferably carried out at a rotating speed of 125 rpm for at least 24 hours, preferably for at least 48 hours. The temperature for the pulverization treatment is, for example, room temperature to about 100° C.

The reaction of the co-pulverization product with the titanium compound may also be performed by a co-pulverization means. Preferably, however, there is employed a method which comprises suspending the co-pulverization product in at least about 0.01 mole, preferably about 0.1 to about 50 moles, per mole of the magnesium compound, of a titanium compound in the liquid phase with or without using an inert solvent such as heptane, hexane or kerosene, and contacting them with each other without pulverization. The reaction temperature is preferably room temperature to about 200° C., for example, and the reaction time is, for example, preferably about 5 minutes to about 5 hours. The reaction may of course be carried out outside these conditions. It is preferred that after the reaction, the reaction mixture is hot-filtered at a high temperature of, say, about 60° to about 150° C., to isolate the product, and the product is well washed with an inert solvent such as hexane, heptane, pentane or kerosene.

(L-b) Method which does not involve co-pulverization of the magnesium compound and the electron donor:

The magnesium compound is reacted with the electron donor in the above-exemplified inert solvent. Or the magnesium compound is dissolved or suspended in the electron donor in the liquid state and they are reacted with each other. It is also possible to use magnesium metal as a starting material and react it with the electron donor while forming a compound of the magnesium.

The amount of the electron donor is preferably about 0.01 to about 10 moles, more preferably about 0.05 to about 6 moles, per mole of the magnesium compound. It is sufficient that the reaction is carried out, for example, at a reaction temperature of room temperature to about 200° C., for about 5 minutes to about 5 hours. After the reaction, the reaction product can be isolated by first filtering or distilling the reaction mixture, and then washing the product with the above-exemplified inert solvent. The reaction of the reaction product with the titanium compound may be carried out in the same way as described in (L-a) above.

(L-c) Method which comprises reacting the reaction product between the magnesium compound and the electron donor with a compound selected from organoaluminum compounds, silicon compounds, and tin compounds, and then reacting the resulting product with the titanium compound:

This is a special embodiment of the method (L-b). The complex compound obtained by the method (L-a) generally has high performance, but some of the complex compounds obtained by the method (L-b) may have inferior performance to those obtained by the method (L-a). It is very effective to react such compounds of inferior performance with the above-exemplified compound selected from organoaluminum compounds, silicon compounds and tin compounds prior to reaction with the titanium compound.

Examples of the organoaluminum compounds used in this method include trialkyl aluminums, dialkyl aluminum hydrides, dialkyl aluminum halides, alkyl aluminum sesqui-halides, alkyl aluminum dihalides, dialkyl aluminum alkoxides, dialkyl aluminum phenoxides, alkyl aluminum alkoxides, alkyl aluminum phenoxyhalides, and the mixtures thereof. Among these, the dialkyl aluminum halides, alkyl aluminum sesquihalides, alkyl aluminum dihalides, and the mixtures thereof are preferred. In the above organoaluminum compounds, the alkyl group may, for example, be a $C_1$–$C_{12}$ alkyl group, the alkoxy group may, for example, be a $C_1$–$C_{12}$ alkoxy group, and the halogen atom may, for example, be Cl, Br or I.

Specific examples of these organoaluminum compounds are triethyl aluminum, triisobutyl aluminum, diethyl aluminum hydride, dibutyl aluminum hydride, diethyl aluminum chloride, diisobutyl aluminum bromide, ethyl aluminum sesquichloride, diethyl aluminum ethoxide, ethyl aluminum ethoxychloride, ethyl aluminum dichloride, and butyl aluminum dichloride.

The compounds, for example halogen compounds or organic compounds, of silicon or tin contain at least one halogen or hydrocarbon group directly bonded to silicon or tin, and may optionally contain hydrogen, an alkoxy group, a phenoxy group, etc. Specific examples are silicon tetrahalides, tetraalkyl silicons, silicon alkylhalides, silicon alkylhydrides, tin tetrahalides, tin dihalides, tin alkylhalides, and tin hydride halides. In the above compounds, the alkyl group may, for example, be a $C_1$–$C_{12}$ alkyl group, and the halogen atom may, for example, be Cl, or Br. Among these silicon tetrachloride and tin tetrachloride are preferred.

The reaction of the reaction product of the magnesium compound/electron donor with the organoaluminum or other compound exemplified above may be carried out in an inert solvent. The amount of the organoaluminum or other compound used is preferably about 0.1 to about 20 moles, more preferably about 0.5 to about 10 moles, per mole of the magnesium compound. The reaction is carried out preferably at a temperature from room temperature to about 100° C. for about 5 minutes to about 5 hours. Preferably, after the reaction, the reaction product is well washed with the above-exemplified inert solvent, and then reacted with the titanium compound. The reaction of the reaction product with the titanium compound may be carried out in substantially the same way as described in (L-a) above.

[M] Method comprising reacting the magnesium compound, electron donor and titanium compound simultaneously:

[N] Method which comprises reacting the reaction product between the titanium compound and the electron donor with the magnesium compound:

Preferably, the reactions in accordance with the methods [M] and [N] are carried out by means of co-pulverization. The pulverizing conditions, the ratio of the materials used, etc. are the same as described hereinabove in [L]. In these methods [M] and [N], it is not preferred to use a large amount of the titanium compound. The preferred amount of the titanium compound is usually about 0.01 to about 1 mole, per mole of the magnesium compound.

The above methods [L], [M] and [N] are typical methods, and many modifications are possible as shown below.

(1) Method [L] in which the reaction with the titanium compound is carried out in the presence of an electron donor:

(2) Method in which an organic or inorganic inert diluent or the above-mentioned compound of silicon, aluminum, germanium, tin, etc. is caused to be present during the reaction, or to act between the reactions, or after the reaction. A typical example is the method (L-c) cited above. These reagents may be used at any desired points in the abovesaid methods, as shown below.

(2-a) Method in which a halogenating agent such as $SiCl_2$ is caused to act on the compounds obtained by each of the methods [L], [M] and [N].

(3) Method in which the titanium compound is caused to act two or more times.

(3-a) Method in which the titanium compound and the electron donor are reacted with the reaction product obtained by each of the method [L] and [M].

(3-b) Method in which the titanium compound, the organoaluminum compound and the electron donor are reacted with the reaction product obtained in method [L] or [M].

Many other modifications are possible by, for example, changing the sequence of adding the reagents, or performing the reaction two or more times, or by reacting another additional reagent. Whichever method is to be employed, it is preferred that the proportions of halogen, titanium, magnesium and the electron donor in the titanium component (a), and the surface area and the X-ray spectrum of the titanium component (a) should be within the aforesaid ranges or in the aforesaid state.

The electron donor desirably included in the catalyst component (a) is an electron donor free from active hydrogen, such as an ester, ether, ketone, tertiary amine, acid halide or acid anhydride. Organic acid esters or ethers are especially preferred, and aromatic carboxylic acid esters or alkyl-containing ethers are most preferred. Suitable aromatic carboxylic acid esters include lower alkyl or alkoxy esters of benzoid acid, lower alkylbenzoic acids or lower alkoxybenzoic acids. The term "lower" means that a group or compound qualified by it has 1 to 4 carbon atoms, preferably 1 or 2 carbon atoms. Suitable alkyl-containing ethers are dialkyl ethers having 4 to 20 carbon atoms such as diisoamyl ether or dibutyl ether.

The catalyst used in the process of this invention is composed of (a) the titanium catalyst component containing magnesium, titanium, halogen and an electron donor and (b) an organometallic compound of a metal of Groups I to III of the periodic table (Mendeleejeff).

The organometallic compound (b) is a metallic compound in which a hydrocarbon group is directly bonded to the metal, and includes, for example, alkyl aluminum compounds, alkyl aluminum alkoxides, alkyl aluminum hydrides, alkyl aluminum halides, alkyl aluminum alkoxides, dialkylzincs, dialkylmagnesiums, and alkyl aluminum halides. In these compounds, the alkyl group may, for example, be a $C_1$–$C_{12}$ alkyl group, the alkoxy group may, for example, be a $C_1$–$C_{12}$ alkoxy group, and the halogen atom may, for example, be Cl, Br or I.

Examples of preferred organometallic compounds are trialkyl or trialkenyl aluminums having a $C_1$–$C_{12}$ alkyl group or a $C_2$–$C_{12}$ alkenyl group, such as $Al(C_2H_5)_3$, $Al(CH_3)_3$, $Al(C_3H_7)_3$, $Al(C_4H_9)_3$ and $Al(C_{12}H_{25})_3$; alkyl aluminum compounds in which a plurality of aluminum atoms are connected through an oxygen or nitrogen atom, such as $(C_2H_5)_2AlOAl(C_2H_5)_2$, $(C_4H_9)_2AlOAl(C_4H_9)_2$ and

$(C_2H_5)_2AlNAl(C_2H_5)_2$;
$C_6H_5$ dialkyl aluminum hydrides having a $C_1$–$C_{12}$ alkyl group such as $(C_2H_5)_2AlH$ and $(C_4H_9)_2AlH$; dialkyl aluminum halides having a $C_1$–$C_{12}$ alkyl group such as $(C_2H_5)_2AlCl$, $(C_2H_5)_2AlI$ and $(C_4H_9)_2AlCl$; and dialkyl aluminum alkoxides or phenoxides having a $C_1$–$C_{12}$ alkyl or alkoxy group. The trialkyl aluminums are especially preferred.

Usually, the organometallic compound (b) is preferably used together with an electron donor (c) such as those exemplified hereinabove, above all organic carboxylic acid esters, especially aromatic carboxylic acid esters such as methyl benzoate, ethyl benzoate, methyl p-toluate, ethyl p-toluate, methyl p-anisate or ethyl p-anisate. Thus, according to one preferred embodiment of the process of this invention, the prepolymerization (i) is carried out in the presence of the electron donor (c), especially the organic carboxylic acid ester, in addition to the titanium catalyst component (a) and the organometallic compound (b).

The polymerization in the co-presence of the organic carboxylic acid ester, even when hydrogen is further present, gives a highly stereospecific polymer in a high yield. In this case, the titanium catalyst component (a), the organometallic compound (b) and the organic carboxylic acid ester (c) may be mixed in any desired order. The suitable amount of such a free organic carboxylic acid ester is not more than about 1 mole, preferably about 0.01 to about 0.5 mole, per metal atom of the organometallic compound (b).

According to the present process of the present invention, the polymerizations (I) and (II) (in the present invention, meant to denote copolymerizations also) are performed in the presence of a catalyst composed of the titanium catalyst component (a) and the organometalic compound (b), preferably an organoaluminum compound. If a customary titanium trichloride catalyst component is used instead of the titanium catalyst component (a) in the above process, it is impossible to produce an olefin copolymer suitable for molding and having the improved properties intended by the present invention.

In the first place, either of the following pre-polymerization steps (I-A), (I-B) or (I-C) is carried out in the process of this invention.

(I-A) A step wherein about 1 to about 1500 g, per millimole of titanium atom, of ethylene is polymerized.

(I-B) A step wherein about 1 to about 1500 g, per millimole of titanium atom, of propylene is polymerized.

(I-C) A step wherein about 1 to about 1000 g, per millimole of titanium atom, of an alpha-olefin having 4 to 10 carbon atoms is polymerized.

In combination with the subsequent polymerization steps (II-1), (II-2) and (II-3) performed in separate reaction zones, this pre-polymerization step is essential for obtaining a chemically blended propylene resin composition having improved properties in accordance with the process of this invention. As shown in Comparative Examples 1 and 2 in comparison with Example 1 in Table 1 hereinbelow, when the pre-polymerization step (I) is omitted while three-step polymerization (II) is performed, it is impossible to form a propylene resin composition having superior flexural stress, low-temperature impact strength and gloss in a well-balanced combination.

The practice of the subsequent three-step polymerization to be carried out in separate reaction zones is also important in combination with the pre-polymerization step (I). For example, when a step of forming crystalline polyethylene or a crystalline ethylene/propylene copolymer is omitted in the subsequent three-step polymerization (II), a marked deterioration occurs in low-temperature impact strength as shown in Comparative Example 1, and it is impossible to provide a propylene resin composition having superior flexural stress, low-temperature impact strength and gloss in a well balanced state in a high yield and with a good reproducibility of quality.

The achievement of superior results by the process of this invention has not been fully elucidated theoretically. As shown in Example and Comparative Examples given hereinbelow, however, it is presumed that by employing the combination of steps (I) and (II) described above under the specified conditions for performing these steps, the chemically blended state of the olefin copolymers obtained and the forms of the constituent polymers and copolymers serve to maintain the properties required of a molding resin in good balance.

When step (I-A) or (I-B) is employed in the pre-polymerization step (I), if the amount of the polymer obtained is smaller or larger than the specified limits, the impact strength of the finally obtained propylene resin composition becomes poor. Furthermore, when the amount of the resulting polymer is smaller than the specified limit in step (I-C), the impact strength of the resulting propylene resin composition likewise becomes poor, and if it is larger than the specified limit, the balance of the properties of the resulting propylene resin composition is destroyed, and the improvement intended by the present invention is difficult to achieve presumably because the content of units other than ethylene and propylene becomes excessively high.

In the pre-polymerization step (I-A), (I-B) or (I-C), the copresence of up to about 1 mole% of another olefin ($C_2$–$C_{10}$ olefin) is permissible. It should be understood therefore that the step (I-A), (I-B) or (I-C) as defined in the specification and the appended claims is meant to include polymerization in the presence of up to 1 mole% of another olefin.

Examples of $C_4$–$C_{10}$ alpha-olefins used in step (I-C) are 1-butene, 1-pentene, 1-hexene, 4-methyl-1-pentene and 1-decene.

The pre-polymerization step (I) may be suitably carried out, for example, at room temperature to about 90° C. In view of the removal of the heat of polymerization or the rate of polymerization, it is not favorable to use too low a temperature. Generally, it is advisable to select temperatures above room temperatures. Suitable temperatures are, for example, about 30° C. to about 80° C.

The pre-polymerization step (I) is preferably carried out in the presence of an inert organic solvent. The solvent may be a known hydrocarbon solvent such as hexane, heptane or kerosene. The reaction pressure can also be selected as desired, and for example, it is from atmospheric pressure to about 20 kg/cm². The amount of the catalyst can also be selected as desired. Preferably, the titanium catalyst component (a) is used in an amount of about 0.01 to about 100 millimoles/liter (solvent), preferably about 0.01 to about 50 millimoles/liter (solvent), as titanium atom, and the organometalic compound (b) is used in such an amount that the mole ratio of the metal atom to Ti is from about 1 to about 1000, preferably from about 1 to about 200. At this time, a chain-transfer agent may or may not be used. Hydrogen is preferred as the chain transfer agent. When hydrogen is used, it is used preferably in a proportion of up to 20 mole% based on the monomers to be fed into the polymerization zone. This pre-polymerization operation may be performed batchwise. Or it may be performed continuously and coupled with the subsequent polymerization steps.

According to the process of this invention, after the pre-polymerization step (I) has been performed, the following three steps are carried out in separate reaction zones different from the pre-polymerization step in the presence of the catalyst used in the pre-polymerization step and the product of the pre-polymerization step.

(II-1) A step of polymerizing propylene to form not less than about 5,000 g, per millimole of titanium atom, of crystalline polypropylene having an isotactic index of at least 90 which accounts for about 55 to about 95% by weight, preferably about 60 to about 95% by weight, of the final resin composition, provided that when step (I-B) is employed as the pre-polymerization step (I), the amount of the product includes that of polypropylene formed in step (I-B).

(II-2) A step of polymerizing propylene and ethylene to form an amorphous or a low-crystalline propylene/ethylene copolymer containing about 20 to about 80 mole%, preferably about 20 to about 75 mole%, of propylene units.

(II-3) A step of polymerizing ethylene, or both ethylene and propylene, to form crystalline polyethylene or a crystalline ethylene/propylene copolymer containing up to about 20 mole%, preferably up to about 15 mole%, more preferably up to about 10 mole%, of propylene units.

The above steps are performed in this order, or in the order of (II-1), (II-3), and (II-2).

To perform the four steps in the process of this invention in separate reaction zones is important for producing a chemically blended propylene resin composition having the desirable improved properties in accordance with this invention, presumably because it prevents the formation of polymers (denoting copolymers also) having a continuously changing composition intermediate between polymers formed in the individual reaction zones. It also serves to perform the process advantageously by a continuous procedure which is industrially preferred.

The amount of polypropylene having an isotactic index of at least 90 formed in the step (II-1) is at least about 55% by weight, preferably about 60 to about 95% by weight, based on the final propylene resin composition. When step (I-B) is employed as the pre-polymerization step (I), the amount of this polypropylene includes the amount of polypropylene formed in step (I-B). In step (II-1), at least about 5,000 g, preferably at least about 10,000 g, of propylene per millimole of titanium atom [including the amount of propylene polymerized in step (I-B) when step (I-B) is employed] is polymerized. More preferably, the amount of propylene is at least about 70% by weight, especially at least about 80% by weight.

The isotactic index denotes the weight percent of the boiling n-heptane-insoluble matter in the polymer. The main purpose of step (II-1) is to form highly rigid crystalline polypropylene, and for this purpose, homopolymerization of propylene is suitable. The presence of a trace (e.g., not more than 1 mole%) of a comonomer such as ethylene is permissible. Accordingly, in the present specification and the appended claims, it should be understood that step (II-1) includes such a case.

The polymerization in step (II-1) is carried out preferably at about 50° C. to about 90° C. If a higher temperature than about 90° C. is employed, the rigidity of the final resin composition tends to be reduced. The polymerization pressure can be properly selected, and may, for examle, be atmospheric pressure to about 20 kg/cm². If desired, a chain transfer agent, preferably hydrogen, is used. Hydrogen is used in an amount of up to about 30% based on the monomers fed to the polymerization zone. Other polymerization conditions may be the same as those used in the pre-polymerization step (I).

The step (II-2) is preferably carried out such that the final propylene resin composition contains about 1 to about 20% by weight, preferably about 2 to about 18% by weight, of a low-crystalline or amorphous ethylene/propylene copolymer containing about 20 to about 80 mole%, preferably about 25 to about 75 mole%, of propylene units.

Preferably, the copolymer formed in step (II-2) is a copolymer in which ethylene units and propylene units are copolymerized at random. Thus, the main purpose of the step (II-2) is to produce a low-crystalline or amorphous ethylene/propylene copolymer and to impart impact strength to the chemically blended propylene resin composition in accordance with this invention.

In order to achieve the aforesaid propylene unit content of the copolymer, it is advisable to set the ethylene/propylene mole ratio in the gaseous phase of the polymerization zone at from 5/95 to about 60/40. The copolymerizability of ethylene and propylene differs slightly depending upon the type of the catalyst system used. Thus, in order to obtain a copolymer having the composition within the above range, a pre-polymerization may be carried out to determine suitable monomer proportions in the gas phase of the polymerization zone. The polymerization step (II-2) may be carried out in the presence or absence of hydrogen as a chain transfer agent. Better results are obtained with regard to the properties of the resulting chemically blended propylene resin composition by performing the polymerization in the absence of hydrogen or in the presence of a small amount of hydrogen to form a copolymer having a relatively high molecular weight. Preferably, the other polymerization conditions are substantially the same as the temperature and pressure conditions described hereinabove with regard to the step (II-1).

In step (II-2), a homopolymer of ethylene and/or a homopolymer of propylene is formed in a small amount simultaneously with the formation of an ethylene/propylene copolymer. In order to include the low-crystalline or amorphous ethylene/propylene copolymer containing about 20 to about 80 mole% of propylene units formed in step (II-2) into the final propylene resin composition in the aforesaid proportion, it is advisable to form the ethylene/propylene copolymer in step (II-2) in an amount of about 1 to about 40% by weight based on the amount of polypropylene formed in step (II-1) (including the amount of polypropylene formed in step (I-B) when step (I-B) is employed as the pre-polymerization step (I)).

By forming a highly crystalline polyethylene or ethylene/propylene copolymer containing less than about 20 mole% of propylene units in step (II-3), the impact strength of the final propylene resin composition can be further increased without a substantial deleterious effect on the high rigidity of the final composition. If this copolymer is formed in an excessive amount, molded articles obtained by molding the finally obtained propylene resin composition may sometimes undergo a reduction in surface gloss or non-uniformity of gloss. Accordingly, the amount of this copolymer should be confined within a suitable range. Preferably, the step (II-3) is performed such that the amount of the highly crystalline polyethylene or ethylene/propylene copolymer is up to about 35% by weight, especially up to about 30% by weight, in the finally obtained propylene resin composition.

When step (I-A) is employed as the pre-polymerization step (I), the amount of the monomer or monomers to be polymerized is determined in consideration of the amount of ethylene copolymerized in step (I-A). The highly crystalline ethylene polymer or ethylene/propylene copolymer formed in step (II-3) has an intrinsic viscosity [η], measured in decalin at 135° C., of preferably at least about 2.5 dl/g, and more preferably about 3 to about 10 dl/g. In order to form such a polymer or copolymer, it is advisable to homo-polymerize ethylene or copolymerize a mixture of ethylene and propylene while adjusting the mole ratio of ethylene/propylene to at least 70:30. The desired constituent proportion of the copolymer and the above mole ratio can be experimentally determined in advance. It is preferred to use a suitable amount of a chain transfer agent. The other conditions may be the same temperature and pressure conditions as described with respect to step (II-1) above.

When step (I-A) of polymerizing ethylene is employed as the pre-polymerization step (I), it is advisable to select the pre-polymerization conditions such that they are suitable for attaining the desirable properties of polyethylene which are described above with respect to step (II-3).

The four steps [(I) and (II)] in the process of this invention are carried out such that the content of ethylene units is about 1 to about 40 mole%, preferably about 2 to about 35 mole%, based on the entire monomer units of the resulting chemically blended propylene resin composition.

When the amount of ethylene units is less than about 1 mole%, the resulting propylene resin composition has poor impact strength, and when it exceeds about 40 mole%, its rigidity is inferior.

According to the process of this invention, there can be produced a chemically blended propylene resin composition which has a suitable balance of properties according to end uses with the content of ethylene units being within the aforesaid range.

For example, when the resin composition produced by the process of this invention contains about 1 to about 15 mole%, preferably about 2 to about 15 mole%, of ethylene units, molded articles having sufficient impact strength and rigidity and excellent surface gloss can be prepared from it. If the content of ethylene units is about 15 to about 40 mole%, preferably about 15 to about 35 mole%, molded articles having higher impact strength, sufficient rigidity and good surface gloss can be prepared from the resin composition.

Thus, when the chemically blended propylene resin composition produced by the process of this invention has a relatively low content of ethylene units, it gives molded articles which have improved impact strength over a composition of the same constituent proportions obtained by a prior art method while not substantially impairing the beautiful surface gloss and rigidity of polypropylene resin. When the content of ethylene units is increased, there can be prepared molded articles which have somewhat reduced surface gloss as compared with polypropylene resin but have excellent rigidity and higher impact strength than a composition of the same constituent proportions obtained by a prior art method. A polymer composition which gives molded articles having such superior rigidity, impact strength and surface gloss in a well balanced state cannot be produced by any prior art method.

In the practice of the process of this invention, the constituent proportions and amounts of polymers or copolymers in the individual steps can be adjusted by properly controlling the polymerization conditions such as the polymerization temperatures, the concentrations of the catalyst components, the concentrations of the monomers, the ratio of monomers, the concentration of a chain transfer agent, the pressures of the monomers and the residence time. These conditions and the constituent proportions and amounts of the polymers formed in the individual steps can be easily determined experimentally. The constituent proportions and quantitative relation of the polymers can be easily determined by sampling and analyzing the polymers obtained in the individual steps.

The polymerization is preferably carried out in the presence of an inert hydrocarbon solvent such as pentane, hexane, heptane and kerosene. The polymerization can be also carried out by gas phase reaction.

The polymerization operation in each step can be performed in a single reactor, or a multiplicity of reactors. If desired, it is possible to remove the unreacted monomer in the polymer obtained in a certain step by a flashing method, etc. before performing the next step.

The following examples illustrate the present invention specifically.

Impact strength was measured by a falling dart impact test in accordance with ASTM D1709-62T; surface gloss was measured in accordance with ASTM D523-62T; and rigidity (flexural stress) was measured in accordance with ASTM D790-66.

EXAMPLE 1

Preparation of a titanium catalyst component

One kilogram of commercial anhydrous magnesium chloride and 0.23 liter of ethyl benzoate were charged in an atmosphere of nitrogen into a vibratory ball mill cylinder made of stainless steel (SUS 32) and containing 36 kg of stainless steel balls and were contacted for 24 hours at 2.8G. The resulting solid treated mass was suspended in titanium tetrachloride and kept in contact with stirring at 80° C. for 2 hours. The solid component was collected by filtration, washed with titanium tetrachloride at 80° C., and then washed with purified hexane until no titanium was detected in the wash liquid. The solid component was dried to obtain a titanium-containing solid catalyst component. The titanium-containing catalyst component contained 2.1% by weight of titanium and 64.5% by weight of chlorine as atoms, and the mole ratio of ethyl benzoate at Ti atom in the catalyst component was 1.4.

Polymerization

An apparatus was used in which a polymerization reactor A (with a capacity of 1 liter) and polymerization reactors B, C and D (all with a capacity of 10 liters) were connected in series, and flash tanks E and F (each having a capacity of 5 liters) were interposed respectively between the reactors B and C and between the reactors C and D.

The polymerization reactor A was hourly charged with 0.029 millimole, calculated as titanium atom, of the titanium-containing catalyst component prepared as above, as a hexane slurry, 1.48 millimoles of triethyl aluminum as a hexane solution, 0.56 millimole of ethyl benzoate as a hexane solution and 0.4 liter in total of hexane. Without adding hydrogen, propylene was polymerized in the reactor A at 45° C. At this time, the pressure of the inside of the reactor A was 0.9 kg/cm$^2$·G.

In the reactor A, polypropylene having a melt index (measured at 230° C. under a load of 2.16 kg) of 0.11 and an isotactic index of 95.4 was formed at a rate of 3.5 g/hour. This corresponded to the polymerization of 120 g of propylene per millimole of titanium.

The polymerization product discharged from the polymerization reactor A was sent to the polymerization reactor B, and propylene and hexane were introduced into the reactor B at a rate of 260 N liter/hr and 0.49 N liter/hr, respectively. Hydrogen was added to an extent of 3.5 mole% to the gaseous phase, and propylene was polymerized at 60° C. The pressure of the inside of the reactor B was 7.4 kg/cm$^2$·G.

From the reactor B, polypropylene having a melt index of 3.52 and an isotactic index of 93.5 was discharged at a rate of 360 g/hr. This corresponded to the polymerization of about 12,000 g of propylene per millimole of titanium atom as a total in the reactors A and B.

The polymerization product discharged from the reactor B was introduced into the flash tank to remove the unreacted propylene, and the residue was then introduced into the polymerization reactor C. The reactor C was charged with 13.3 N liters/hr of propylene and 18.5 N liters/hr of ethylene and further 0.3 liter/hr of hexane, and ethylene and propylene were copolymerized. The pressure of the inside of the reactor C was 2.8 kg/cm$^2$·G, and the mole ratio of ethylene/propylene in the gaseous phase was 34/66. The amount of ethylene and propylene polymerized in the reactor C was 56.9 g/hr.

Subsequently, the polymerization product was introduced into the flash tank F to remove the unreacted monomers and hydrogen, and then conducted to the polymerization reactor D. Ethylene was further introduced into the reactor D at a rate of 10.5 N liters/hr, and hydrogen was added to an extent of 3 mole% based on the gaseous phase. Thus, ethylene was polymerized.

In the reactor D, polyethylene having an intrinsic viscosity (measured in decalin at 135° C.) of 7.9 was formed at a rate of 13.1 g/hr.

The polymerization product discharged from the reactor D was placed under reduced pressure to remove the unreacted monomer and hydrogen. The resulting polymer was separated by filtration, and dried to afford a chemically blended propylene resin composition as a white powder at a rate of 378 g/hr.

The resulting composition had a melt index of 2.11 and an ethylene content of 11 mole%. It consisted of 91.5% by weight of crystalline polypropylene having an isotactic index of 93.5, 5.0% by weight of an ethylene/propylene copolymer having a propylene unit content of 60 mole%, and 3.5% by weight of polyethylene.

An antioxidant was added to the resulting resin composition, and the mixture was molded to prepare test specimens. The test specimens were examined for rigidity, impact strength and gloss, and the following results were obtained.

Flexural stress: 14500 kg/cm$^2$.

Falling dart impact strength: 170 kg·cm (at −10° C.); 185 kg·cm (at 0° C.).

Gloss: 60%.

COMPARATIVE EXAMPLE 1

The procedure of Example 1 was repeated except that the pre-polymerization in the reactor A was not performed. The constituent proportions and amounts of the polymers obtained in the individual polymerization reactors were much the same as in Example 1. The physical properties of the resulting polymer composition are shown in Table 1. It is seen from Table 1 that in the absence of the pre-polymerization step, the composition having the same constituent proportions has markedly reduced impact strength.

COMPARATIVE EXAMPLE 2

The procedure of Comparative Example 1 was repeated except that ethylene was fed into the polymerization reactor D at a rate of 69 N liters/hr, and the amount of hydrogen was changed to 4.5 mole% based on the gaseous phase, and in the reactor D, an operation of increasing the amount of ethylene polymerized was performed. The results are shown in Table 1. It is seen from Table 1 that when the pre-polymerization step is omitted and the content of ethylene units in the final composition is increased, the impact strength of the resin composition increases but its gloss is markedly reduced.

TABLE 1

| | Pre-poly-meri-zation | Polymer composition | | | | | | Impact strength (kg . cm) | | |
|---|---|---|---|---|---|---|---|---|---|---|
| | | PP (wt.%) (*1) | EPR (wt.%) (*2) | PE (wt.%) (*3) | Ethylene content (mole%) | Melt index | Flexural stress (kg/cm$^2$) | at −10° C. | at 0° C. | Gloss (%) |
| Example 1 | Yes | 91.5 | 5.0 | 3.5 | 11.0 | 2.11 | 14,500 | 170 | 185 | 60 |
| Comparative Example | | | | | | | | | | |

TABLE 1-continued

| | Pre-poly-meri-zation | Polymer composition | | | | Melt index | Flexural stress (kg/cm$^2$) | Impact strength (kg . cm) | | Gloss (%) |
|---|---|---|---|---|---|---|---|---|---|---|
| | | PP (wt.%) (*1) | EPR (wt.%) (*2) | PE (wt.%) (*3) | Ethylene content (mole%) | | | at −10° C. | at 0° C. | |
| 1 Comparative Example 2 | No | 92.5 | 4.0 | 3.5 | 11.0 | 2.10 | 14,500 | 50 | 60 | 55 |
| 2 | No | 76.4 | 4.5 | 19.1 | 28.0 | 1.10 | 13,000 | 200 | 215 | 15 |

(*1) Crystalline polypropylene having an isotactic index of 93 to 94.
(*2) Ethylene/propylene copolymer having a propylene content of about 60 mole %.
(*3) Polyethylene having an intrinsic viscosity of about 6 to 8.

COMPARATIVE EXAMPLE 3

An apparatus was used in which a polymerization reactor A (with a capacity of 1 liter) and polymerization reactors B and C (each with a capacity of 10 liters) were connected in series, and a flash tank E having a capacity of 5 liters was interposed between the reactors B and C.

The polymerization reactor A has charged hourly with 0.029 millimole, calculated as titanium atom, of the titanium catalyst component prepared in Example 1 as a hexane slurry, 1.55 millimoles of triethyl aluminum as a hexane solution, 0.58 millimole of ethyl benzoate as a hexane solution and 0.4 liter in total of hexane. Without adding hydrogen, propylene was polymerized at 45° C. in the reactor A. At this time, the pressure of the inside of the polymerization reactor A was 0.9 kg/cm$^2$·G. In the polymerization reactor A, polypropylene having a melt index of 0.11 and an isotactic index of 95.4 was formed at a rate of 3.5 g/hr. This corresponded to the polymerization of 120 g of propylene per millimole of titanium.

The polymerization product discharged from the polymerization reactor A was sent to the polymerization reactor B. The reactor B was charged hourly with 260 N liters of propylene and 0.49 N liter of hexane, and hydrogen was added to an extent of 10.0 mole% based on the gaseous phase. Propylene was then polymerized at 60° C. The pressure of the inside of the reactor B was 7.5 kg/cm$^2$·G.

From the reactor B, polypropylene having a melt index of 34.5 and an isotactic index of 91 was discharged at a rate of 350 g/hr. This corresponded to the polymerization of about 12,000 g of propylene per millimole of titanium atom as a total in the reactors A and B.

The polymerization product discharged from the reactor B was introduced into the flash tank E to remove the unreacted propylene. The residue was then introduced into the polymerization reactor C. The reactor C was charged hourly with 31.6 N liters of propylene, 15.7 N liters of ethylene and further 0.3 liter of hexane, and ethylene and propylene were copolymerized. The pressure of the inside of the reactor C at this time was 2.8 kg/cm$^2$·G. The ethylene/propylene mole ratio in the gaseous phase was 16/84. The amount of the monomers polymerized in the reactor C was 88 g/hr.

The polymerization product discharged from the reactor C was placed under reduced pressure to remove the unreacted monomers and hydrogen. The resulting polymer was separated by filtration, and dried to afford a polymer composition as a white powder at a rate of 38 g/hr. The resulting polymer composition had a melt index of 24.4 and an intrinsic viscosity of 1.76 and an ethylene content of 3.3 mole%. The physical properties of the resulting polymer composition were as follows:

Content of ethylene/propylene copolymer having a propylene content of about 70 mole%: 6.5% by weight.
Flexural stress: 15,500.
Impact strength: 90 kg·cm (at 0° C.); 75 kg·cm (at −10° C.).
Gloss: 70%

EXAMPLE 2

The polymerization product discharged from the reactor B prepared in the same manner as in Example 1 was introduced into the flash tank to remove the unreacted propylene, and the residue was then introduced into the polymerization reactor C. The reactor C was charged with 6.2 N liters/hr of propylene and 12.2 N liters/hr of ethylene and further 0.3 liter/hr of hexane, and ethylene and propylene were copolymerized. The pressure of the inside of the reactor C was 1.5 kg/cm$^2$·G, and the mole ratio of ethylene/propylene in the gaseous phase was 27/73. The amount of ethylene and propylene polymerized in the reactor C was 47 g/hr.

Subsequently, the polymerization product was introduced into the flash tank F to remove the unreacted monomers and hydrogen, and then conducted to the polymerization reactor D. Ethylene was further introduced into the reactor D at a rate of 85.4 N liters/hr, and hydrogen was added to an extent of 6.8 mole% based on the gaseous phase. Thus, ethylene was polymerized.

In the reactor D, polyethylene having an intrinsic viscosity (measured in decalin at 135° C.) of 4.8 was formed at a rate of 107 g/hr.

The polymerization product discharged from the reactor D was placed under reduced pressure to remove the unreacted monomer and hydrogen. The resulting polymer was separated by filtration, and dried to afford a chemically blended propylene resin composition as a white powder at a rate of 471 g/hr.

The resulting composition had a melt index of 1.2 and an ethylene content of 32.7 mole%. It consisted of 73.3% by weight of crystalline polypropylene having an isotactic index of 93.5, 4.0% by weight of an ethylene/propylene copolymer having a propylene unit content of 64 mole%, and 22.7% by weight of polyethylene.

An antioxidant was added to the resulting resin composition, and the mixture was molded to prepare test specimens. The test specimens were examined for rigidity, impact strength and gloss, and the following results were obtained.
Flexural stress: 14500 kg/cm$^2$.
Falling dart impact strength: >210 kg·cm (at −10° C.).
Gloss: 35%.

EXAMPLE 3

The polymerization product discharged from the reactor B prepared in the same manner as in Example 1 was introduced into the flash tank to remove the unreacted propylene, and the residue was then introduced into the polymerization reactor C. The reactor C was charged with 3.7 N liters/hr of propylene and 28.8 N liters/hr of ethylene and further 0.3 liters/hr of hexane, and ethylene and propylene were copolymerized. The pressure of the inside of the reactor C was 1.55 kg/cm$^2$·G, and the mole ratio of ethylene/propylene in the gaseous phase was 43/57. The amount of ethylene and propylene polymerized in the reactor C was 63 g/hr.

Subsequently, the polymerization product was introduced into the flash tank F to remove the unreacted monomers and hydrogen, and then conducted to the polymerization reactor D. Ethylene was further introduced into the reactor D at a rate of 64 N liters/hr, and hydrogen was added to an extent of 6.5 mole% based on the gaseous phase. Thus, ethylene was polymerized.

In the reactor D, polyethylene having an intrinsic viscosity (measured in decalin at 135° C.) of 4.6 was formed at a rate of 80 g/hr.

The polymerization product discharged from the reactor D was placed under reduced pressure to remove the unreacted monomer and hydrogen. The resulting polymer was separated by filtration, and dried to afford a chemically blended propylene resin composition as a white powder at a rate of 463 g/hr.

The resulting composition had a melt index of 1.5 and an ethylene content of 31.5 mole%. It consisted of 78.2% by weight of crystalline polypropylene having an isotactic index of 93.5, 4.5% by weight of an ethylene/propylene copolymer having a propylene unit content of 39 mole%, and 17.3% by weight of polyethylene.

An antioxidant was added to the resulting resin composition, and the mixture was molded to prepare test specimens. The test specimens were examined for rigidity, impact strength and gloss, and the following results were obtained.

Flexural stress: 15000 kg/cm$^2$.

Falling dart impact strength: >210 kg·cm (at −10° C.).

Gloss: 35%.

What we claim is:

1. In a process for producing a chemically blended propylene resin composition having an ethylene content of about 1 to about 40 mole% based on the entire monomer units of the resin composition which comprises (i) a pre-polymerization step wherein a small amount of ethylene or an alpha-olefin is polymerized in the presence of a catalyst composed of (a) a titanium catalyst component containing magnesium, titanium, halogen and an electron donor and (b) an organometallic compound of a metal of Groups I to III of the Mendeleejeff's periodic table, and (ii) a multiplicity of subsequent polymerization steps wherein propylene and ethylene are polymerized in the presence of the reaction product containing the catalyst of the prepolymerization step (i), the amount of the titanium catalyst component (a) used, calculated as titanium atom, being about 0.01 to about 100 millimoles/liter of solvent when the polymerization is carried out in the presence of a solvent and about 0.01 to about 100 millimoles/liter of the volume of the polymerization zone when the polymerization is carried out in the gaseous phase; the improvement wherein (I) the pre-polymerization step (i) is:

(I-A) a step wherein about 1 to about 1500 g, per millimole of titanium atom, of ethylene is polymerized;

(I-B) a step wherein about 1 to about 1500 g, per millimole of titanium atom, of propylene is polymerized; or (I-C) a step wherein about 1 to about 1000 g, per millimole of titanium atom, of an alpha-olefin having 4 to 10 carbon atoms is polymerized; and (II) said multiplicity of polymerization steps (ii) are the following steps (II-1), (II-2) and (II-3) which are carried out in separate reaction zones different from the reaction zone of the pre-polymerization step (i) in the above order or in the order of (II-1), (II-3), and (II-2), (II-1) a step of polymerizing propylene to form not less than about 5000 g, per millimole of titanium atom, of crystalline polypropylene having an isotactic index of at least 90 which accounts for about 55 to about 95% by weight of the final resin composition, provided that when step (I-B) is employed as the pre-polymerization step (i), the amount of the product includes that of polypropylene formed in step (I-B), (II-2) a step of polymerizing propylene and ethylene to form an amorphous or a low-crystalline propylene/ethylene copolymer containing about 20 to about 80 mole% of propylene units; and (II-3) a step of polymerizing ethylene, or both ethylene and propylene, to form crystalline polyethylene or a crystalline ethylene/propylene copolymer containing up to about 20 mole% of propylene units.

2. The process of claim 1 wherein the pre-polymerization is carried out in the further presence of an electron donor (c).

3. The process of claim 1 wherein the halogen/titanium mole ratio of the titanium catalyst component (a) is more than about 4, and when the component (a) is washed with hexane at room temperature, titanium is not substantially removed from it.

4. The process of claim 2 wherein the electron donor (c) is an organic carboxylic acid ester, and the amount of the ester is not more than about 1 mole per metal atom of the organometallic compound (b).

5. The process of claim 1 wherein the polymerization is carried out in the presence of a solvent and the amount of the organometallic compound (b) is such that the mole ratio of the metal atom therein to the titanium atom is from about 1 to about 1000.

6. The process of claim 1 wherein the polymerization is carried out in the gas phase, and the amount of the organometallic compound (b) is such that the mole ratio of the metal atom therein to the titanium atom is from about 1 to about 1,000.

7. The process of claim 1 wherein step (II-1) is conducted at a temperature of from about 50° to about 90° C.

* * * * *